United States Patent [19]

Mican

[11] Patent Number: 5,315,393
[45] Date of Patent: May 24, 1994

[54] ROBUST PIXEL ARRAY SCANNING WITH IMAGE SIGNAL ISOLATION

[75] Inventor: Stephen G. Mican, Munster, Ind.

[73] Assignee: Amoco Corporation, Chicago, Ill.

[21] Appl. No.: 861,929

[22] Filed: Apr. 1, 1992

[51] Int. Cl.5 .................... H04N 5/335; H04N 9/07
[52] U.S. Cl. ........................ 348/268; 348/302
[58] Field of Search ............ 358/213.31, 213.12, 358/213.15, 213.22, 213.27, 44; 250/578, 208.1; 257/233, 249, 250

[56] References Cited

U.S. PATENT DOCUMENTS

| | | | |
|---|---|---|---|
| 4,011,402 | 3/1977 | Koike et al. | 358/213.15 |
| 4,471,228 | 9/1984 | Nishizawa et al. | 358/213.12 |
| 4,631,417 | 12/1986 | Brilman | 358/213.12 |
| 4,692,794 | 9/1987 | Suzuki | 358/44 |
| 4,831,454 | 5/1989 | Tanaka et al. | 358/213.12 |
| 5,161,024 | 11/1992 | Oishi | 358/213.31 |

*Primary Examiner*—Michael T. Razavi
*Assistant Examiner*—Wendy R. Greening
*Attorney, Agent, or Firm*—Stephen G. Mican

[57] ABSTRACT

Methods and apparatus for propagating robust scanning signals in pixel addressing operations in a pixel-to-pixel sequence that produces a predetermined pattern of alternating colors in an image signal so that a single channel, sequential color signal is generated from the pixel addressing operations in optoelectronic image transducers to reduce complexity and improve image fidelity.

6 Claims, 11 Drawing Sheets

ROBUST PIXEL ARRAY SCANNING WITH IMAGE SIGNAL ISOLATION

FIELD OF THE INVENTION

The invention relates to addressing of optoelectronic image transducers that comprise a plurality of discrete picture elements, or pixels, and more particularly to methods and apparatus for propagating robust scanning signals for pixel addressing operations and isolation of an image signal from the pixel addressing operations in optoelectronic image transducers to reduce complexity and improve image fidelity.

BACKGROUND OF THE INVENTION

Most practical television systems comprise the dissection and reconstruction of an image that comprises a plurality of picture elements, or pixels. Dissection of the image is performed by an optoelectronic transducer that comprises an image sensor. An image sensor has, or simulates, a plurality of discrete sensor pixel elements arranged to allow each sensor pixel element to provide a brightness value that corresponds to the average brightness of a corresponding image pixel. The brightness values of the sensor pixels are sequentially transmitted as a sequential image signal over a single transmission channel to avoid the complexity of providing a separate transmission channel for each pixel.

The image is reconstructed by sequential distribution of the sequential image signal within an optoelectronic transducer that comprises an image display. An image display comprises, or simulates, a plurality of image display pixels, so that the brightness value of each sensor pixel controls the brightness level of a corresponding display pixel. If the image sensor or display comprises an array of truly discrete pixels, the pixels must be individually addressed as part of the image dissection or reconstruction process.

Methods and apparatus for individually addressing discrete pixels of image sensors and displays have attempted to reduce the inherent complexity involved in individually selecting each pixel in the array according to a predetermined sequence at a predetermined scanning rate. The earliest attempts to address an image display comprising an array of pixels, typically an array of neon glow lamps, involved addressing each of the glow lamps by sequentially switching the image signal to each glow lamp with a motor-driven commutator.

Of course, with arrays that comprise hundreds of thousands of discrete pixels, such a motor-driven commutator is not practical because the commutator would have to have at least one contact for each pixel. It would not only be very expensive, but the large number of contacts and associated connecting wires would result in serious image degradation due to variation of impedance over the frequency range of the image signal.

One relatively simple way to address, or scan, each pixel in a group of pixels is to make each pixel sensitive to a scanning signal, such as a pulse, wherein each pixel is responsive upon receipt of the scanning signal only for the duration of the pulse. If the scanning signal is propagated from one pixel to another at a predetermined pixel scanning rate, then each pixel in the group will sequentially become responsive in the proper sequence for the proper duration.

A later attempt to reduce the number of contacts in the mechanical commutator for an image display involved the use of such a pulse-like scanning signal. This system involved switching the sequential image signal from one line of pixels to another with a mechanical commutator, but turning on each display pixel in each line with the scanning signal. The scanning signal was propagated along a passive delay line, with each pixel in each line of pixels connected at a different point along the delay line so that each pixel would turn on at the proper instant for the proper duration.

Later attempts to sequentially address image display pixels eliminated mechanical switching by making each pixel sensitive only to the receipt of a pair of scanning signals, with a first scanning signal propagated from one line of pixels to another at a line scanning rate through a first delay line and a second scanning signal propagated from one pixel to another in each line at a pixel scanning rate through a second delay line. These various attempts involved combining the image signal with the line or pixel scanning signals so that the image signal would control the brightness of each pixel made responsive by the receipt of the two scanning signals.

These systems suffer from at least two serious problems when used for image displays that comprise a large number of pixels. First, the amplitude and waveform of the pulse-like scanning signal deteriorates as it travels down the delay lines, with the deterioration proportional to the number of delay line sections. Since at least one section is required for each line of pixels in the first delay line and at least one section for each pixel in a line of pixels in the second delay line, serious scanning signal deterioration is likely for dense arrays. This can lead to erratic scanning or brightness levels in at least a portion of the array.

Second, all prior systems have either required switching or combining of the image signal through the individual address lines for the lines of pixels or for the pixels in each line. This increases the likelihood of bleed-over of the image signal and scanning signal to adjacent address lines, thereby causing more than one pixel to become responsive at any instant. The wideband image signal is also degraded by propagation through the address lines due to the inductive and capacitive reactances associated with the long, thin and closely coupled address lines required for dense arrays.

An early system used a complex arrangement of impedance networks in the delay line in an attempt to reduce degradation of the scanning signal waveform as the scanning signal propagated down the delay line. The use of delay lines with complex sections would make their implementation with dense arrays prohibitively expensive. Furthermore, the attenuation of such lines is usually greater than simple delay line configurations.

Another system compensated for the amplitude loss of the scan pulse as it was propagated through each delay line with the use of resistances of varying values at each tap in the delay line to reduce amplitude variation. As a result, the amplitude of the scanning signal generated for dense pixel arrays would have to be very large. Also, the resulting shift in load resistance at each tap would cause deterioration of the scanning signal waveform as it propagated down the delay line.

Because of the problems associated with the propagation of scanning signals to pixels through delay lines as described above, much effort has been directed to the use of binary counters or shift registers for activation of pixels in an array through similar addressing schemes.

For instance, a first shift register system would be used to sequentially provide a first activation signal to each line of pixels and a second shift register system would be used to sequentially provide a second activation signal to each pixel in each line of pixels. In this case, each pixel is sensitive to the receipt of the combination of the first and second activation signals.

Although the use of shift registers provide a robust activation signal for each pixel in the array during the scanning process, the complexity of the circuitry for dense arrays is undesirable. Furthermore, the shift registers must be driven by suitable clock circuitry, and the clock circuitry must be synchronized to the image signal with special synchronization circuitry. The implementation of a scanning system for dense arrays using such shift registers would therefore be complex and costly.

The systems that have used such shift registers for the scanning process have all involved the switching or combining of the image signal with the activation signals to propagate the image signal down at least one set of address lines. This causes deterioration of the wideband image signal required for dense arrays, and also creates the possibility of bleed-over of the image signal and scanning signal to adjacent address lines, thereby causing more than one pixel to become responsive at any instant, as described above for prior art delay-line systems.

SUMMARY OF THE INVENTION

The invention overcomes the limitations of the prior art by completely separating the image signal path from that of the scan or activation signal paths. Each of the pixels of an image display or sensor is coupled directly to a common image signal port via the image signal path. Unlike the prior art, the image signal is not switched or combined with the scan or activation signals, and it is not propagated down the scanning signal path that comprises the address lines.

Furthermore, the invention permits the image signal path and characteristic impedance to be controlled independently of the addressing system for enhancement of image sensor or display performance. The invention also allows the use of pixel arrays wherein the pixels have a common substrate, and the image signal port is directly coupled to the substrate to reduce the image signal path length and simplify fabrication.

The invention preferably comprises the use of at least one scanning signal that is propagated from one pixel to another, from one line of pixels to another or from one pixel to another in each line of pixels, through at least one active delay line that regenerates the scan pulse in each delay line section, thereby preventing deterioration of the scan pulse amplitude and waveform as it propagates down the delay line.

In the preferred embodiment, for an optoelectronic image transducer that comprises a plurality of discrete optoelectronic picture elements that are individually addressed over a predetermined image frame scanning period that corresponds to the addressing of said plurality of picture elements that comprises a complete image frame, the invention comprises a method of sequentially addressing each of said picture elements, comprising the steps of: sensitizing said picture elements to at least one scanning signal to activate said picture elements upon receipt of said at least one scanning signal propagated through at least one scanning signal path; simultaneously coupling an image signal through an image signal path separate from said at least one scanning signal path to all of said picture elements that has a parameter that is proportional to a parameter of those of said picture elements that are activated; and propagating said at least one scanning signal through said at least one scanning signal path from at least one to at least another of said picture elements until all of said picture elements that comprise said complete image frame have been activated.

In the preferred embodiment, for an optoelectronic image transducer that comprises a plurality of discrete optoelectronic picture elements that are individually addressed over a predetermined image frame scanning period that corresponds to the addressing of said plurality of picture elements that comprises a complete image frame, the invention comprises apparatus for sequentially addressing each of said picture elements, comprising: means for sensitizing said picture elements to at least one scanning signal to activate said picture elements upon receipt of said at least one scanning signal propagated through at least one scanning signal path; means for simultaneously coupling an image signal through an image signal path separate from said at least one scanning signal path to all of said picture elements that has a parameter that is proportional to a parameter of those of said picture elements that are activated; and means for propagating said at least one scanning signal through said at least one scanning signal path from at least one to at least another of said picture elements until all of said picture elements that comprise said complete image frame have been activated.

DESCRIPTION OF THE INVENTION

Figure 1:
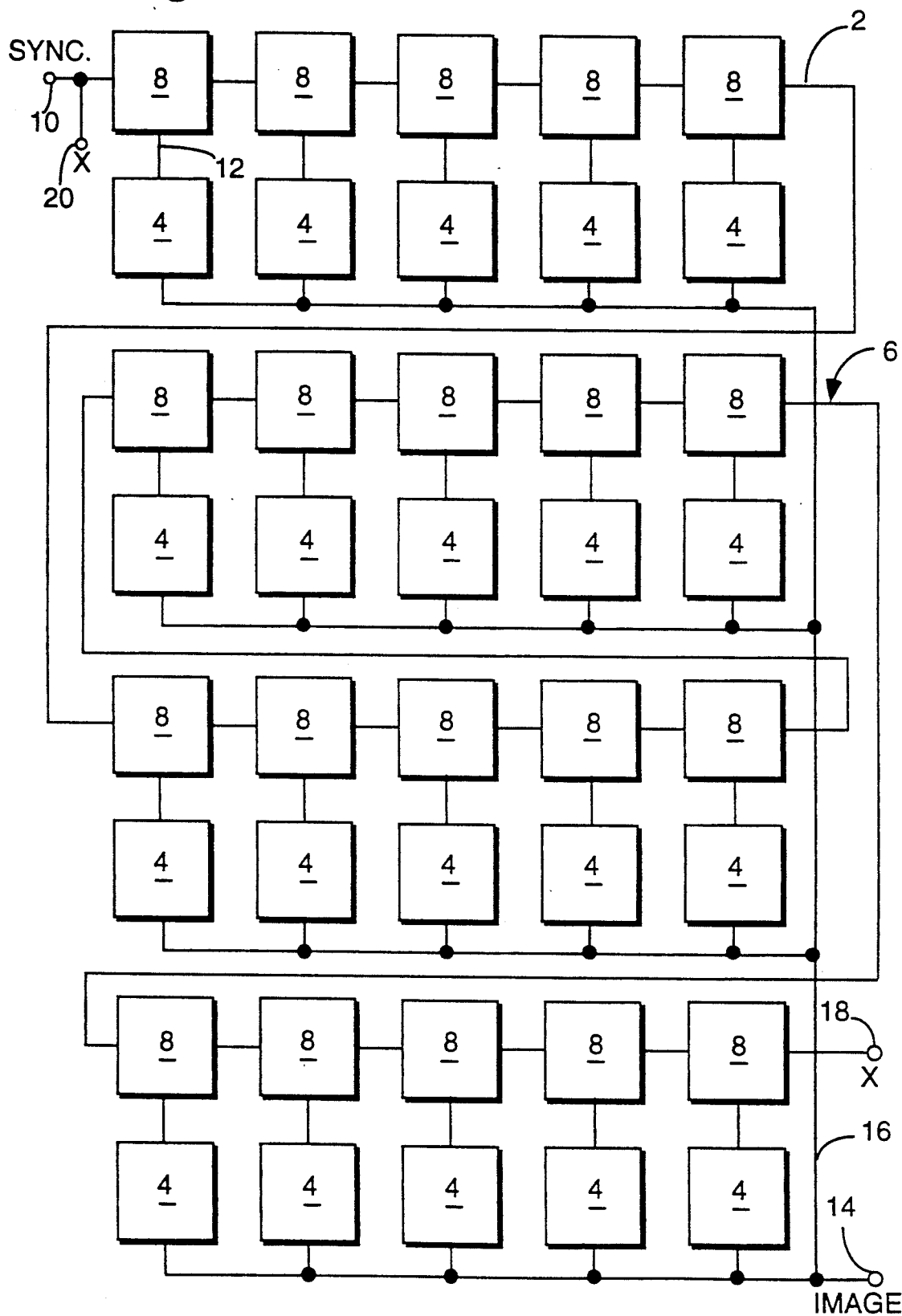
FIG. 1 is a schematic diagram of a simple embodiment of the invention that uses a single scanning signal.

Referring to the drawings, wherein reference characters designate like or corresponding parts or features throughout the views, FIG. 1 is a schematic diagram of a simple embodiment of the invention. An optoelectronic transducer array 2 comprises a plurality of picture elements, or pixels, 4 that are coupled to at least one active delay line 6 that preferably comprises a plurality of active sections, taps or gates 8.

Each of the gates 8 preferably comprises a monostable gate circuit, although it may comprises another configuration, such as an amplified resistance-capacitance (R-C) or inductance-capacitance (L-C) section, or tap on a portion of such an amplified section, so long as the gate 8 has the proper time delay as represented by a time constant. Each of the gates 8 have a time constant that is predetermined to let each gate 8 switch from a first state, such as an "off" state, to a second state, such as an "on" state, for a duration that comprises a predetermined pixel scanning rate.

The gates 8 are interconnected as, or to simulate, active sections of the active delay line 6. A first gate 8 receives a signal, such as a pulse-like "scanning signal", or synchronization signal, applied to an input terminal 10 of the active delay line 6. The scanning signal switches between a first state, such as an "off" state, and a second state, such as an "on" state, the first gate 8 senses when the scanning signal switches back to the first state from the second state and switches its output from the first state to the second state in response. After a predetermined period, controlled by the time constant of the first gate 8, the output of the first gate 8 switches back to the first state from the second state.

A second gate 8, coupled to the first gate 8, senses the change in differential between the shift of the output of the first gate 8 from the second state to the first state, and switches its output from the first state to the second state in response. Just as with the first gate 8, after the predetermined period, the output of the second gate 8 returns to the first state from the second state. A third gate 8, coupled to the second gate 8, senses the change in differential between the shift of the output of the second gate 8 from the second state to the first state, and switches its output from the first state to the second state in response.

This process continues between any gate 8 and the following gate 8, so that the outputs of the gates 8 along the active delay line 6 sequentially turn on and off for the predetermined period. Thus, the "scanning signal" is effectively propagated down the active delay line without attenuation or distortion.

Each of the gates 8 has its output coupled to at least one scanning signal input of a corresponding one of the pixels 4 through a scanning signal path 12. At the same time, a common image signal port 14 is simultaneously coupled to all of the pixels 4 through an image signal path 16. Each of the pixels 4 are sensitive to the state of the one of the gates 8 to which it is coupled so that each of the pixels 4 becomes responsive as an optoelectronic transducer element as long as the one of the gates 8 to which it is coupled remains in the second state.

If the transducer 2 is a sensor, then each of the pixels 4 transmits an image signal via the image signal path 16 to the image signal port 14 only for so long as its associated one of the gates 8 remains in the second state. If the transducer 2 is a display, then each of the pixels 4 generates a brightness level that is representative of an image signal transmitted to it via the image signal path 16 via the image signal port only for so long as its associated one of the gates 8 remains in the second state.

It is clear that the image signal, whether generated or received by the pixels 4, has a signal path that is independent and isolated from the scanning signal path. Thus, the image signal need not suffer signal deterioration that would otherwise be associated with the switching operation and propagation of the scanning signal along the scanning signal path 12. Instead, the image signal may be propagated without switching operations directly between the pixels 4 and the image signal port 14 along the image signal path 14. The image signal path 16 may be configured for low image signal propagation loss without concern of the pixel scanning operations. For instance, the image signal path 16 may comprise a common conductive substrate surface upon which the array of pixels 4 are fabricated.

When the transducer 2 comprises an image sensor, each of the pixels 4 preferably comprises a field emitter device that has at least one emitter surface coated with a photosensitive material, such as cesiated silver oxide. In this way, when each of the pixels 4 is responsive while its associated one of the gates 8 is in the second state, the current through the emitter surface, and thus the current through the image signal port 14 through the image signal path 16, is proportional to the intensity of incident light on the responsive one of the pixels 4 at any instant. Alternatively, the pixels may comprise photocell, photodiode, phototransistor or photomultiplier elements.

Likewise, when the transducer 2 comprises an image display, each of the pixels preferably comprises a field emitter device that has at least one emitter surface that is in proximity to an electroluminescent surface, such as a standard conductive electroluminescent phosphor. In this way, when each of the pixels 4 is responsive while its associated one of the gates 8 is in the second state, the current from the emitter surface to the electroluminescent surface, and therefore the brightness level of the surface, is proportional to the current of the image signal applied to it from the image signal port 14 via the image signal path 16. Alternatively, the pixels 4 may comprise glow lamps, light emitting diodes (LED's) or liquid crystal elements.

For clarity of illustration in FIG. 1, the transducer system 2 comprises a total of twenty of the pixels 4, with each of the pixels 4 coupled to an associated one of twenty of the gates 8 by one of twenty of the scanning signal paths 12. The array of the twenty pixels 4 is arranged in four rows of five of the pixels 4 each. As shown in FIG. 1, the sequence of the scanning operation, following the path of the scanning signal through the active delay line 6, is through odd lines 1 and 3 first, followed by even lines 2 and 4 second, thereby providing two-to-one interlaced scanning.

Of course, this particular arrangement is for purposes of illustration only, and most image systems according to the invention will have many more lines of the pixels 4 with many more of the pixels 4 per line, and according to the invention, scanning may be progressive, interlaced in any ratio, or even according to a random pattern. It is only important that the image sensor and the image display according to the invention share the same scanning pattern and scanning rate.

The scanning signal may be recirculated through the active delay line 6 to provide "autoscanning" operation, wherein the pixel array sequentially scans all of the pixels at the predetermined scanning rate independently of any external synchronizing sources, except for the initial input of the scanning signal. The initial scanning signal input may be derived from the video signal or from an impulse resulting from start up of the display. For autoscanning operation, an output 18 of the active delay line 6 is connected to an input 20 of the active delay line 6.

Figure 2:
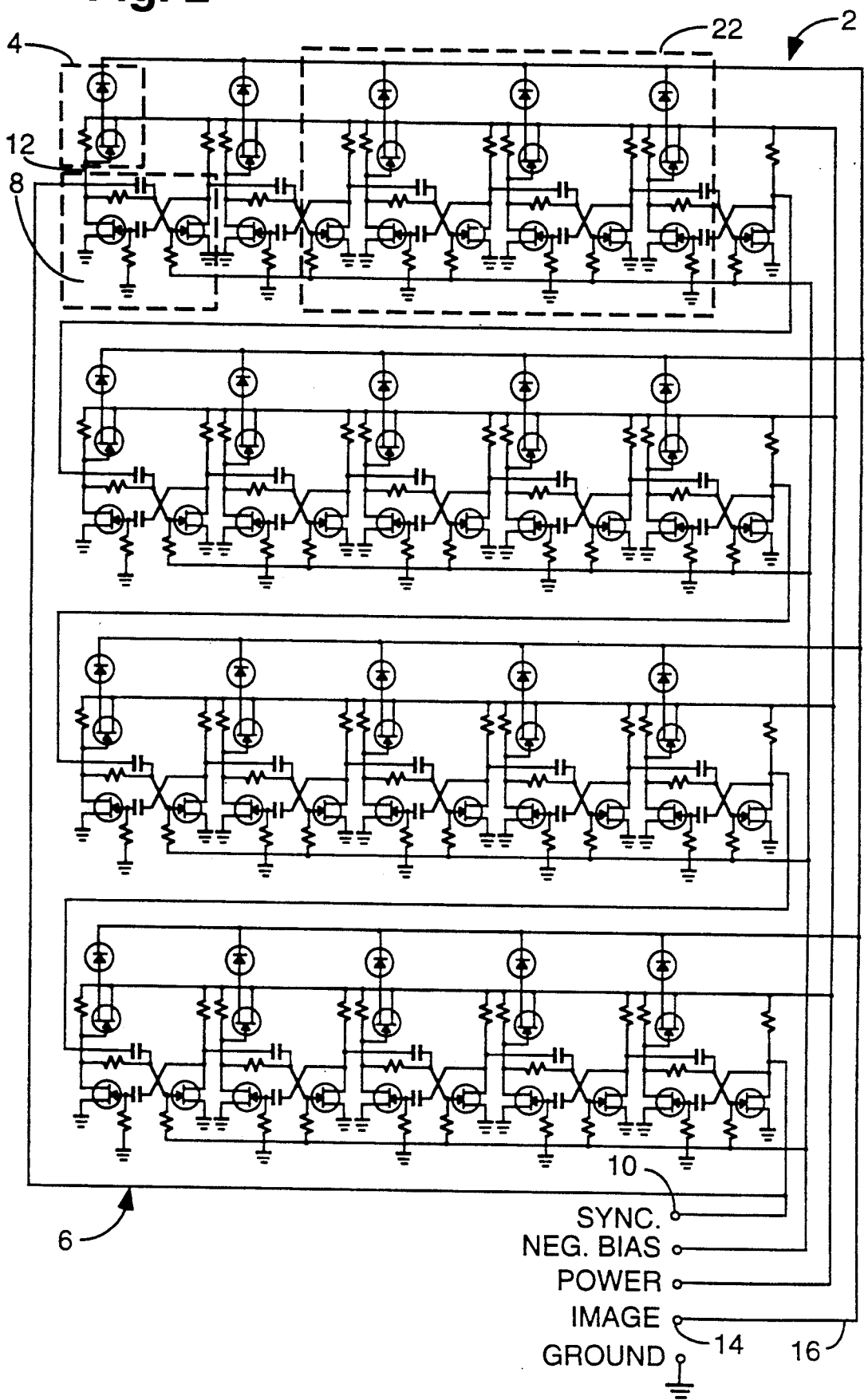
FIG. 2 is a schematic diagram of a specific implementation of the invention that uses a single scanning signal.
Figure 3:
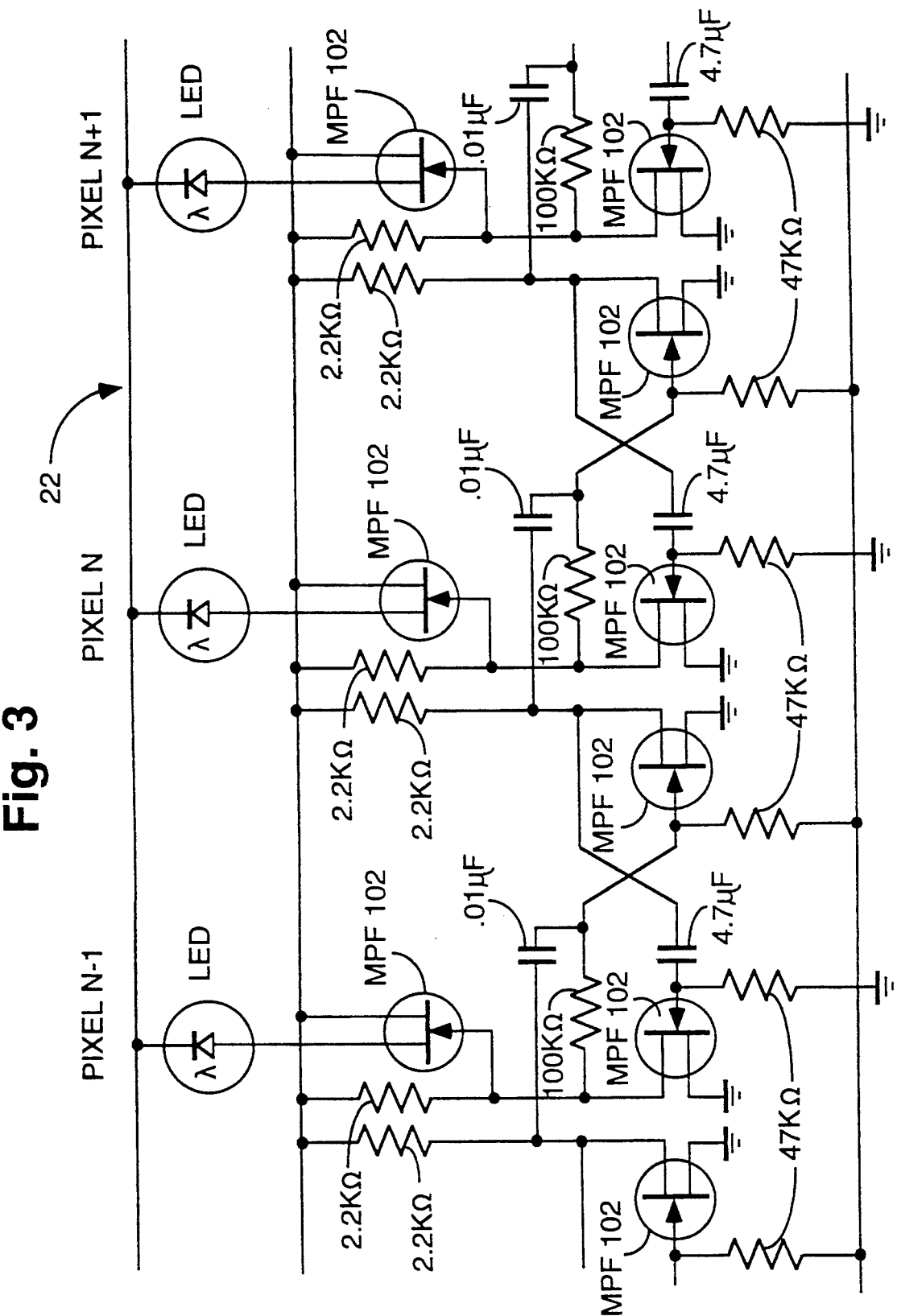
FIG. 3 is a detail of a section of the system shown in FIG. 2.

FIG. 2 is a schematic diagram of a specific implementation of the transducer system 2 according to the embodiment of the invention described above that has been reduced to practice as an image display array using LED's for the pixels 4. It uses 20 of the pixels 4 arranged in four lines of five of the pixels 4 each, with progressive, line-by-line scanning, instead of two-to-one interlaced, as shown in FIG. 1. FIG. 3 is a detail of a section of the system, represented by an area 22 enclosed by a dashed line in FIG. 2. It represents three successive ones of the pixels 4, labeled Pixels N−1, N and N+1 in FIG. 3, with their associated portions of the active delay line 6.

This reduction to practice shows values of components that provided a pixel scan rate of approximately five pixels per second, or one complete scan per four second period. This slow scan rate was selected for demonstration purposes only, and is not representative of the capabilities of the system. However, this reduction to practice illustrates the need to provide a separate one of the gates 8 for each of the pixels 4 in the transducer system 2.

For the image transducer system 2 to be capable of rendering the maximum theoretical resolution of an image dissected into 525 lines of pixels with a four-to-three aspect ratio, or 700 pixels per line, assuming no retrace periods, the transducer system 2 must comprise a total of 367,500 of the pixels 4. This means that the transducer system 2 must also comprise 367,500 of the gates 8. Although it is possible to provide designs for the pixels 4 that provide the regenerating action of the gates 8 so that the pixels 4 simulate the action of the gates 8, the entire transducer system 2 remains relatively complex for such a large number of the pixels 4.

Therefore, it is generally desirable to provide the image transducer system according to the invention with a plurality of scanning signals, all having different propagation rates between the different ones of the pixels 4 so that the pixels 4 sequentially become responsive for a predetermined period in a predetermined sequence. In such multiple scanning signal configurations, each of the pixels 4 only becomes responsive upon receipt of all of the scanning signals in the second state.

Figure 4:
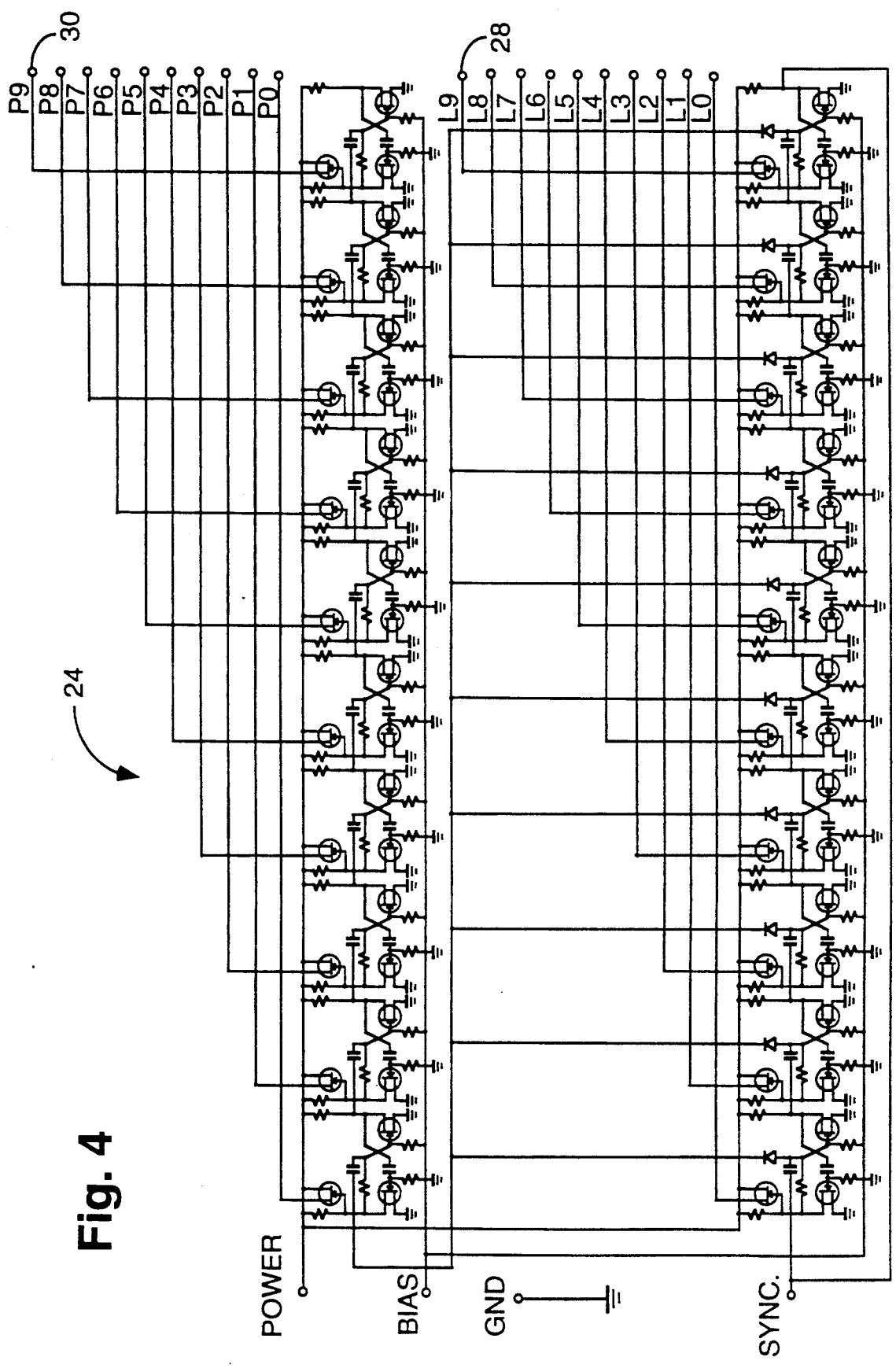
FIG. 4 is a schematic diagram of scanning circuitry for a transducer system according to the invention that uses two scanning signals.
Figure 5:
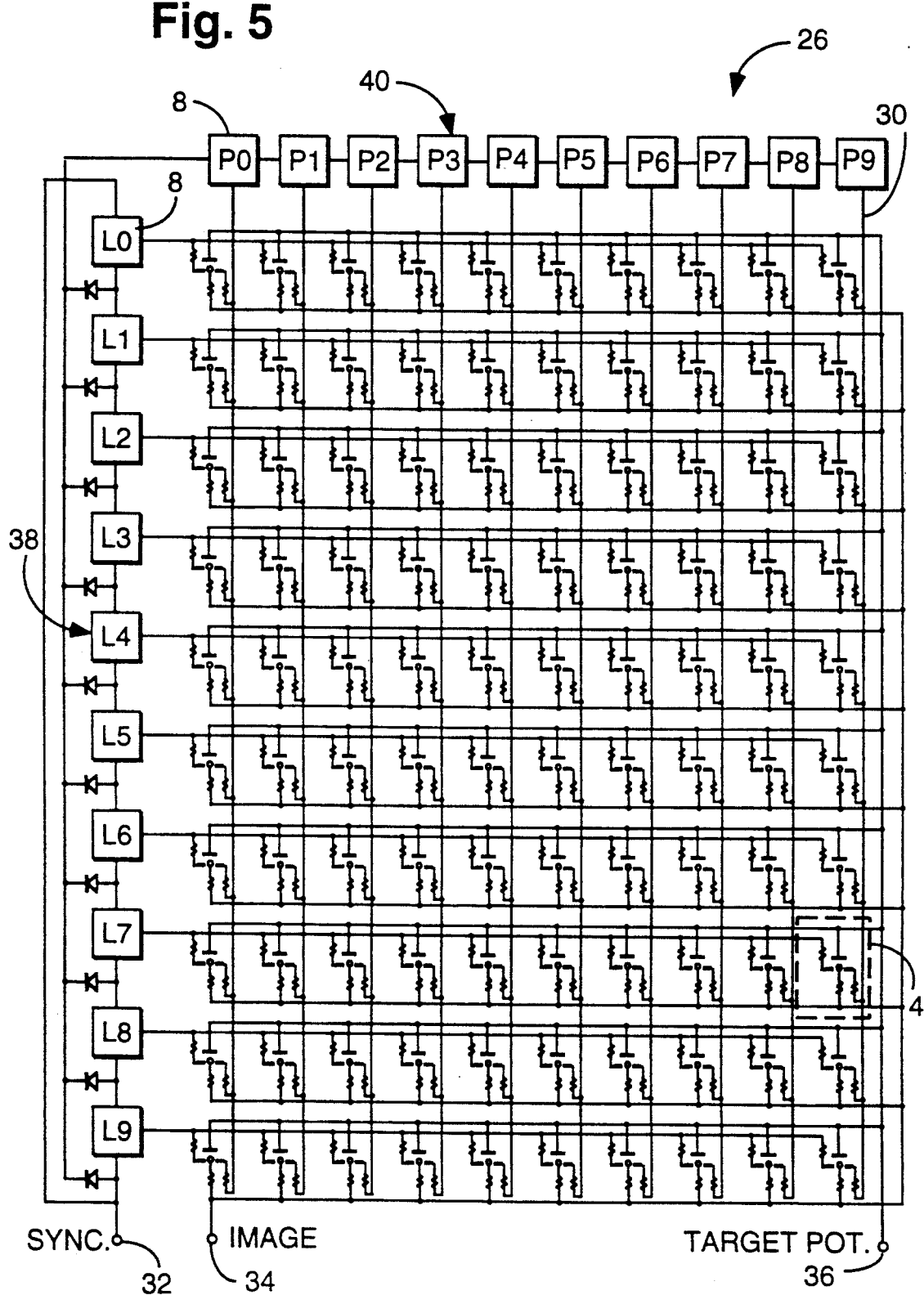
FIG. 5 is a schematic diagram of a complete image transducer system according to the invention that uses two scanning signals.

A simple embodiment of the invention incorporating a plurality of scanning signals comprises a first and a second scanning signal. In this case, each of the pixels of the transducer system are sensitive to the receipt of the first and second scanning signals, and are responsive as long as the first and second scanning signals received by them remain in the second state. FIGS. 4 and 5 are schematic diagrams of scanning signal circuitry 24 and a complete image transducer system 26 that comprises a simple array of one hundred of the pixels 4 arranged in ten lines of ten of the pixels 4 each. In this case, each of the pixels 4 comprise a field emitter pixel.

Referring to FIG. 4, it will be noted that the scanning circuitry comprises essentially the same number of components as shown for the simple array of 20 pixels shown in FIG. 2. This is because the scanning circuitry 24 once again comprises a total of twenty of the gates 8, just as shown in FIG. 2.

In this case, however, the time constants of ten of the gates 8, with line gate outputs 28 labeled L0 through L9, are predetermined to let these ones of the gates 8 remain in the second state for a duration of a predetermined line scanning rate. Since each line comprises ten of the pixels 4, the predetermined line scanning rate is generally about one tenth of a corresponding pixel scanning rate. Thus, the first scanning signal comprises a line scanning signal that effectively propagates sequentially from one to another of the line gate outputs L0 through L9 at the line scanning rate.

The gates 8 with pixels gate outputs 30 labeled P0 through P9 have time constants that are predetermined to let each of these ones of the gates 8 remain in the second state only for a duration that corresponds to a predetermined pixel scanning rate, which in this case is ideally in the range of ten times that of the predetermined line scanning rate. Thus, the second scanning signal comprises a pixel scanning signal that effectively propagates sequentially from one to another of the line gate outputs P0 through P9 at the pixel scanning rate.

FIG. 5 shows the coupling of each of the gates 8 to their corresponding ones of the pixels 4 in transducer system 26. It should be noted that each of the line gate outputs 28 are coupled to ten of the pixels 4 in a single line. Thus, each of the gates 8 that has one of the line gate outputs 28 controls an entire line of the pixels 4. Likewise, each of the pixel gate outputs 30 are coupled to one of the pixels 4 in each of the ten lines of the pixels 4.

Each of the pixels 4 are sensitive to the states of the line and gate scanning signals that they receive on their line gate outputs 28 and the pixel gate outputs 30. They only are responsive when the line and gate scanning signals that they receive are both in their second states. Consequently, each of the pixels 4, line by line, and pixel by pixel within each line, sequentially become responsive as the scanning operation of the gates 8 occurs. Although progressive, line-by-line scanning is shown for clarity of illustration, any other desired scanning operation may be implemented with multiple scanning signals, such as interlaced or random patterns.

Figure 6:
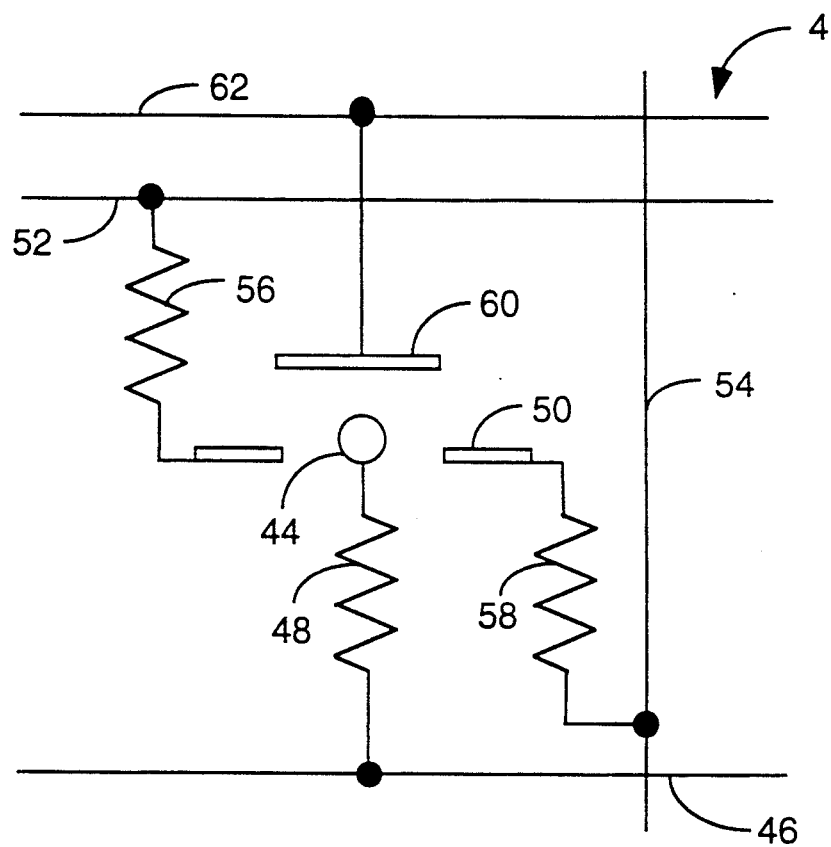
FIG. 6 is a simple field emitter pixel schematic configuration for one of the pixels for the transducer system shown in FIG. 5.

It should be noted that the scanning circuitry 24 shown in FIG. 4, and as part of the transducer system 26 shown in FIG. 6, is configured for autoscanning operation, similar to that described for the embodiment shown in FIG. 2. The scanning process is initiated, and may be periodically synchronized, with a suitable signal applied to a synchronization input terminal 32.

An image signal is simultaneously coupled between all of the pixels 4 and a common image signal port 34. A high tension potential applied to a target potential input 36 provides a sufficiently high field to sustain emission from the emitters to the collectors of the pixels 4 when under control of the line and pixel scanning signals. The common-gate configuration of the image signal port relative to the emitters of the pixels 4 provides a low-impedance image signal path to the pixels 4 that is isolated from the relatively high impedance scanning signal paths for the line and pixel scanning signals via the line gate outputs 28 and the pixel gate outputs 30.

Since the gates 8 are segregated into two interactive groups, one group of which control the propagation of the line scanning signal and the other of which control the propagation of the pixel scanning signal, these groups may be considered to be two discrete active delay lines, a line scanning signal delay line 38 and a pixel scanning delay line 40. They each propagate their respective scanning signals throughout the array of the pixels 4 to scan them according to a predetermined sequence within a predetermined period.

FIG. 6 shows a simple field emitter pixel schematic configuration for one of the pixels 4 shown in FIG. 5. This schematic illustrates how the pixel 4 can respond to the combination of more than one scanning signal with a single control gate. Quite simply, the pixel 4 has a field emitter 44 that is coupled to a common image signal port via a common image signal path 46. For purposes of stability or impedance matching, the image signal path 46 may optionally comprise a certain amount of resistance, represented by a resistance 48.

The pixel 4 also has a control gate structure 50 that is coupled to an associated one of the line gate outputs 28 via a first scanning signal path 52 and to an associated one of the pixel gate outputs 30 via a second scanning signal path 54. The coupling of the control gate 50 to the first scanning signal path 52 and the second scanning signal path 54 is resistive, as represented by resistances 56 and 58, respectively. These resistances 56 and 58 preferably comprise resistive links of substantially equal values of resistance to serve as a potential divider when the line and scanning signals applied to the control gate 50 have different states.

When the line and scanning signals on the control gate 50 are both in the second state represented by a predetermined high potential level, the potential on the control gate 50 is at this same high potential level. This potential level is sufficient to allow a large amount of field emission to occur, thereby allowing a large current flow to a target collector structure 60 when the target 60 has a high tension potential applied to it via a high tension potential supply path 62, typically a semitransparent conductive target if the transducer system 26 is an image sensor, or a conductive phosphor if the transducer system 26 is an image display.

If either one or both of the scanning signals are in the first state as represented by a predetermined low potential level, the potential on the control gate 50 falls because of the decrease in applied potential, if both scanning signals are in the first state, or the drop in potential caused by the division between the resistances 56 and 58 when one of the scanning signals is in the second state and the other is in the first state. In either case, the drop in potential is sufficient to make the pixel 4 nonresponsive, whether it be for an image sensor or for an image display.

When used as an image sensor, the emitter 50 is typically coated with a photoemissive material, such as cesiated silver oxide, to make the work function of the emitter 50 a function of incident light that falls on the pixel 4 through the semitransparent conductive target 60. Thus, the emission current through the common image signal path 46 varies as a function of incident light. When used as an image display, the emission current through the emitter 50 varies as a function of an image signal applied to the common image signal path 46, and the variation in current causes a corresponding variation in brightness of the phosphor screen target 60, thereby providing a change in brightness level proportional to the variation in current of the image signal.

The simple embodiments of the invention described above are presented primarily to clarify the principles of the invention. They are not necessarily the preferred embodiments for most image transducer applications that comprise many thousands of pixels. It is evident, for instance, that even when two scanning signals are implemented as described above, a large number of gates are required. For instance, using a typical 525 line, two-to-one interlaced scanning standard with a four-by-three aspect ratio, such as the NTSC scanning standard, an image transducer system must have approximately 486 lines with 648 pixels per line to render maximum resolution, presuming that the pixels are symmetrical to provide equal horizontal and vertical resolution.

The reason that 525 lines of 700 pixels per line are not required, or even beneficial, for such systems is because of the well known dormant periods at the end of each line and at the end of each interlaced field that are generally referred to as the "horizontal blanking period" and the "vertical blanking period", respectively. The vertical blanking period comprises the duration of approximately 20 lines per interlaced field, so that the theoretical field line count is reduced from 262.5 lines to 243 lines. The total number of lines in a complete video frame period that comprises both the odd and even line fields is then 486 lines. With a four-by-three aspect ratio, the number of pixels per line needed for equal horizontal and vertical resolution is then $486 \times 4/3 = 648$ pixels per line. The horizontal blanking period then comprises the duration of the fifty two pixels from the theoretical maximum of 700 per line.

Therefore, it is desirable to provide an image transducer system that has at least 486 lines of 648 pixels per line for compatibility with standard 525 line scanning systems. If two scanning signals are used, a line scanning signal and a pixel scanning signal, a total of $486 + 648 = 1134$ of the gates 8 would have to be used. That is, referring to FIG. 5, the line scanning delay line 38 would have to have 486 of the gates 8 and the pixel scanning delay line 40 would have to have 648 of the gates 8. This large number of the gates 8, as well as the associated number of connection points for them along the perimeter of the image transducer system 26, is less than ideal. Furthermore, the arrangements of the line scanning delay line 38 and the pixel scanning delay line 40 in FIG. 5 do not take into account the interlaced fields of the scanning system, or the adaptability to a tri-color imaging system.

Figure 7:
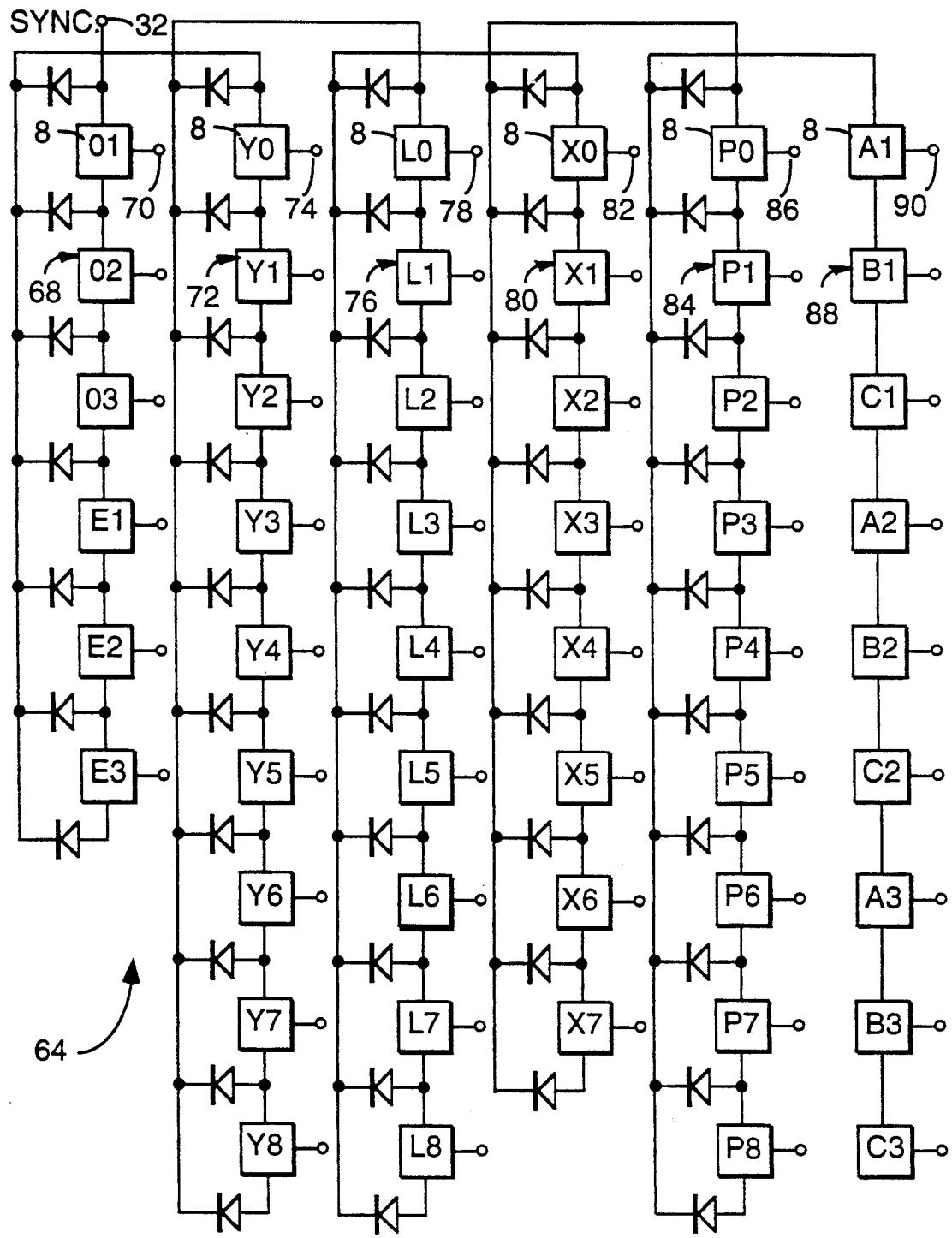
FIG. 7 is a block diagram of scanning circuitry for a preferred embodiment of the invention.
Figure 8:
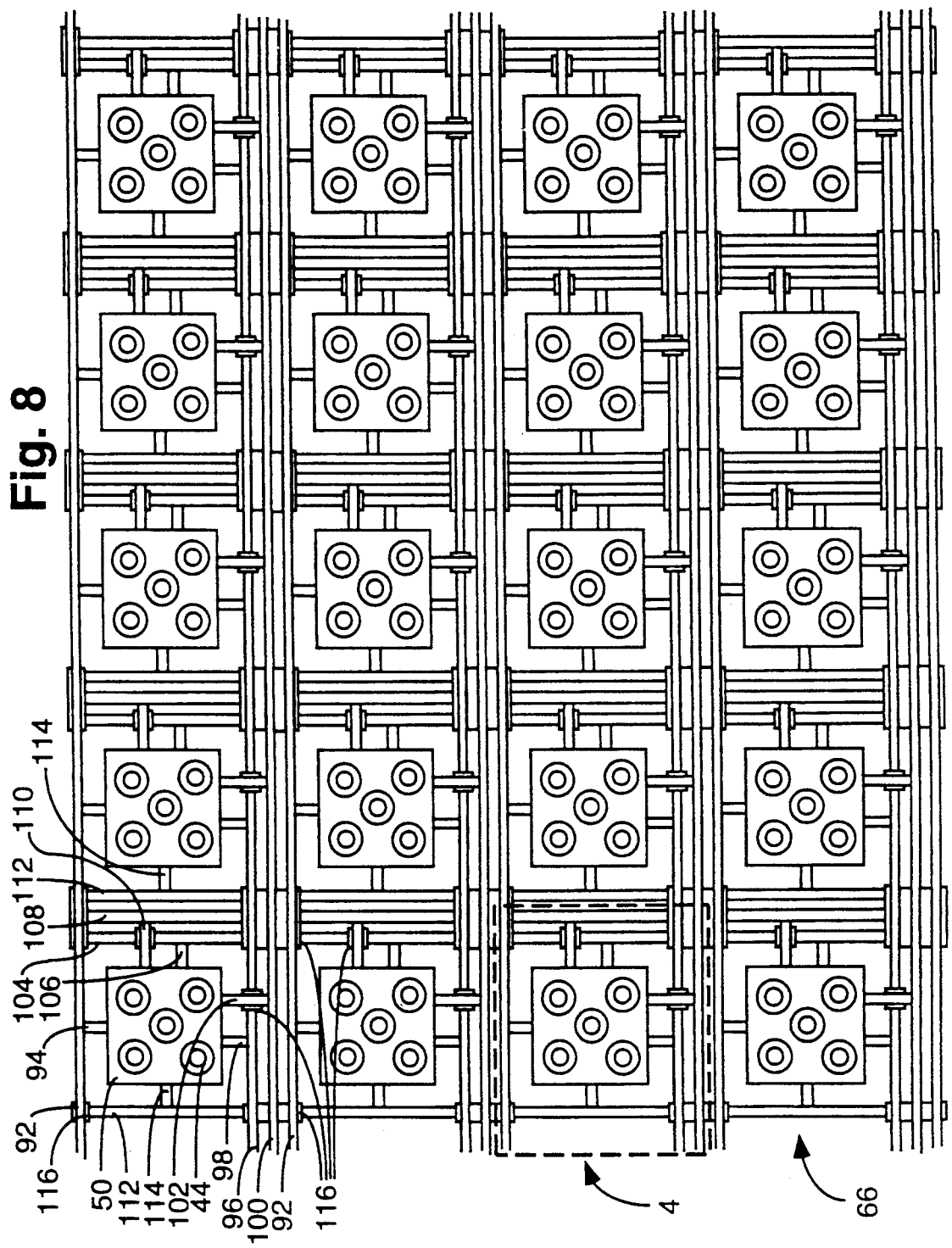
FIG. 8 is a section of an array of the pixels of an image transducer system used with the scanning system shown in FIG. 7.
Figure 9:
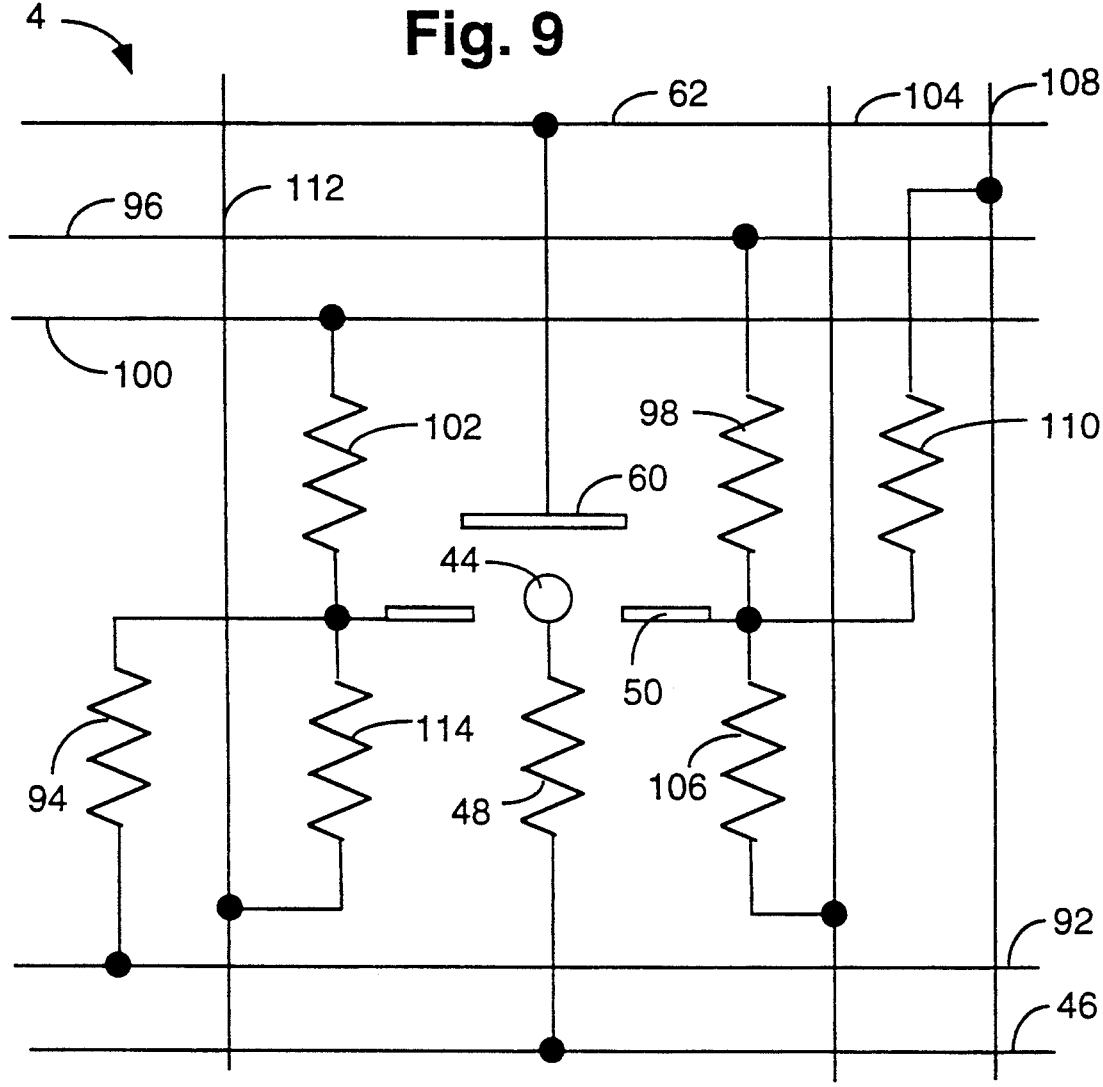
FIG. 9 is a simple schematic diagram that illustrates how a pixel for an image transducer according to the preferred embodiment can respond to the combination of six scanning signals with a single control gate.

According to the invention, and as a preferred embodiment, a larger number of interacting scanning signals are propagated through an image transducer system to reduce the number of the gates 8 and their associated connections, as well as to simplify the adaptability of the image transducer system to imaging systems that have interlaced, tri-color image signals. FIG. 7 is a block diagram of scanning circuitry 64 according to the invention that only requires fifty of the gates 8 and their associated connections for a standard 525 line, interlaced, tri-color system as described above. FIG. 8 is a section of an array of the pixels 4 in an image transducer system 66 wherein the pixels 4 are configured to be sensitive to the receipt of all six of the scanning signals, and to be responsive as long as all six of the scanning signals remain in their second state. FIG. 9 is a schematic diagram for one of the pixels 4 shown in FIG. 8.

A total of six different active delay lines propagate six different scanning signals to the array of pixels 4 in the transducer system 66. These active delay lines comprise an odd/even field group scanning signal line 68 that has six field group scanning signal outputs 70, a line group scanning signal line 72 with nine line group scanning outputs 74, a line scanning signal line 76 with nine line outputs 78, a pixel group scanning signal line 80 with eight pixel group scanning signal outputs 82, a pixel scanning signal line 84 with nine pixel scanning signal outputs 86 and a color scanning signal line 88 with nine color scanning signal outputs 90.

FIG. 9 illustrates how the pixel 4 can respond to the combination of six scanning signals with a single control gate. The pixel 4 has the field emitter 44 that is coupled to a common image signal port via the common image signal path 46, similar to that described in connection with FIG. 6. Also, for purposes of stability or impedance matching, the image signal path 46 may optionally comprise the resistance 48.

The pixel 4 also has the control gate structure 50 and the target collector structure 60 of the pixel 4 described in connection with FIG. 6. However, the control gate 50 is coupled to six different scanning paths in this embodiment of the invention. The control gate 50 is coupled through a first scanning signal path 92 that comprises a resistance 94 to an associated one of the field group scanning signal outputs 70 of the odd/even field group scanning signal line 68. The control gate 50 is coupled through a second scanning signal path 96 that comprises a resistance 98 to an associated one of the line group scanning signal outputs 74 of the line group scanning signal line 72.

The control gate 50 is coupled through a third scanning signal path 100 that comprises a resistance 102 to an associated one of the line scanning signal outputs 78 of the line scanning signal line 70. The control gate 50 is coupled through a fourth scanning signal path 104 that comprises a resistance 106 to an associated one of the pixel group scanning signal outputs 82 of the pixel group scanning signal line 80. The control gate 50 is coupled through a fifth scanning signal path 108 that comprises a resistance 110 to an associated one of the pixel scanning signal outputs 86 of the pixel scanning signal line 84. The control gate is coupled through a sixth scanning signal path 112 that comprises a resistance 114 to an associated one of the color scanning signal outputs 90 of the color scanning signal line 88.

Just as the case with the pixel 4 as described in connection with FIG. 6, the resistances 94, 98, 102, 106, 110 and 114 preferably comprise resistive links of substantially equal values of resistance to serve as a potential divider when any of the six scanning signals applied to the control gate 50 have different states.

When all of the scanning signals on the control gate 50 are in the second state represented by a predetermined high potential level, the potential on the control gate 50 is at this same high potential level. This potential level is sufficient to allow a large amount of field emission to occur, thereby allowing a large current flow to the target collector structure 60 when the target 60 has a high tension potential applied to it via the high tension potential supply path 62, typically a semitransparent conductive target if the transducer system 66 is an image sensor, or a conductive phosphor if the transducer system 66 is an image display.

If any of the six scanning signals are in the first state as represented by a predetermined low potential level, the potential on the control gate 50 falls because of the decrease in applied potential, if all of the scanning signals are in the first state, or the drop in potential caused by the division between the resistances 94, 98, 102, 106, 110 and 114 when at least one of the scanning signals is in the second state and at least one of the others is in the first state. In either case, the drop in potential is sufficient to make the pixel 4 nonresponsive, whether it be for an image sensor or for an image display.

Returning to FIG. 7, the propagation of scanning signals throughout the transducer system 66 is as follows. Each of the gates 8 in the odd/even field group scanning signal line 68 has a predetermined time constant that allows it to remain in the second state for the duration of eighty one lines. The output 70 of the first of these gates 8 is coupled to a first group of eighty one odd numbered lines of the pixels 4 in the transducer system 66, the output 70 of the second of these gates 8 is coupled to a second group of eighty one odd numbered lines and the output 70 of the third of these gates 8 is coupled to a third group of eighty one odd numbered lines. The output 70 of the fourth of these gates 8 is coupled to a first group of eighty one even numbered lines, the output 70 of the fifth of these gates 8 is coupled to a second group of eighty one even numbered lines and the output 70 of the sixth of these gates 8 is coupled to a third group of eighty one even numbered lines.

The effect of the field group scanning signal is to select one group of eighty one odd or even lines at a time from an odd line field or an even line field for a duration of eighty one lines. During this time, the line group scanning signal selects nine consecutive group of nine lines of these eighty one, while the line scanning signal selects nine consecutive lines from each group of nine. Consequently, each of the gates 8 in the line group scanning signal line 72 has a predetermined time constant that allows it to remain in the second state for a duration of nine lines, while each of the gates 8 in the line scanning signal line 76 has a predetermined time constant that allows it to remain in the second state for the duration of only one line.

As the output 70 of the first gate 8 in the field group scanning signal line 68 switches from the first to the second state in response to a synchronization signal applied to the synchronization input terminal 32, the output 74 of the first of the gates 8 in the line group scanning signal line 72 switches from the first to the second state to select a first group of nine consecutive odd lines from the eighty one selected by the first gate 8 of the field scanning signal line 68. At the same time, the output 78 of the first gate 8 of the line scanning line 76 switches from the first state to the second state to select the first line of the nine lines selected by the first gate 8 of the line group scanning signal line 72. This process continues, line by line in each line group, and line group by line group in each field group, until all the lines of both the odd and even fields have been selected.

Each of the pixels 4 are selected in each selected line by a similar process. As the output 78 of the first gate in the line scanning signal line 76 switches from the first to the second state, the output 82 of the first gate 8 of the pixel group scanning signal line 80 switches from the first state to the second state to select a first group of eight groups of eighty one consecutive one of the pixels 4 each. Consequently, each of the gates 8 in the pixel group scanning signal line 80 has a predetermined time constant that lets it remain in the second state for a duration of eighty one of the pixels 4.

At the same time, the output 86 of the first gate 8 of the pixel scanning signal line 84 selects the first nine consecutive ones of the pixels 4 from the first group of the pixels 4, and the output 90 of the first gate 8 of the color scanning signal line 88 selects the first one of the pixels 4 in the first nine ones of the pixels 4 selected by the first gate 8 of the pixel scanning signal line 84. Thus each one of the gates 8 of the pixel scanning signal line 84 has a predetermined time constant that lets it remain in the second state for a duration of nine of the pixels 4, and each one of the gates 8 of the color scanning signal line 88 has a predetermined time constant that lets it remain in the second state for a duration of a single one of the pixels 4. This process continues, pixel by pixel, until each pixel in each line has been selected.

Preferably, the gates 8 of the color scanning signal line 88 sequentially select ones of the pixels 4 that represent different colors, such as the primary transmissive colors red, green and blue. Thus, three consecutive ones of the pixels 4 in each line represent these three different colors. Also, it is desirable for the color sequence of the pixels 4 in the even lines to be complimentary with the color sequence of the odd lines, so that an even distribution of color triplets of the pixels 4 are generated from the combination thereof. For instance, if the odd lines have a green-blue-red sequence pattern, then the even lines should have a red-green-blue sequence pattern, and so forth.

FIG. 8 illustrates an arrangement of the pixels 4 that is suitable for the image transducer system 66. The field emitters 44 are preferably fabricated on a common conductive substrate that comprises the image signal path 46. The control gates 50 are insulated from the image signal path 46, such as by an insulating layer. The scanning signal paths 92, 96, 100, 104, 108 and 112 are preferably patterns of metalization, whereas the resistances 94, 98, 102, 106, 110 and 114 are preferably resistive links between the control gates 50 and the respective scanning signal paths 92, 96, 100, 104, 108 and 112, such as resistive thin films or doped areas of a semi-conductive material. Insulating layers 116 provide isolation between intersecting portions of the scanning signal paths 92, 96, 100, 104, 108 and 112.

Although each of the pixels 4 of the transducer system 66 in FIG. 8 comprises five of the field emitters 44, any convenient number of field emitters 44 may be used. However, for best resolution, each of the pixels 4 should have an approximately square configuration. As well known in the art, a circular pixel configuration can result in an effective loss of resolution of as much as thirty percent when used for both the image sensor and the image display.

As indicated above, it is desirable for the consecutive pixels 4 in each line of the pixels 4 of the transducer system 66 to represent different colors in a predetermined sequence of colors. In this way, the adjacent pixels 4 can merge into color pixel triplets, as well known in the art, the physiological nature of the human visual system renders small detail in reproduced color images as values of brightness only. That is, only relatively large features are rendered as colored features, and the smaller features are rendered only as monochromatic. Thus, the number of color pixel triplets in an image sensor or display only need be a fraction of the total number to properly dissect and reproduce color images with no apparent loss of detail. For instance, a third as many color pixel triplets as the total number of pixels 4 is ideal.

Figure 10:
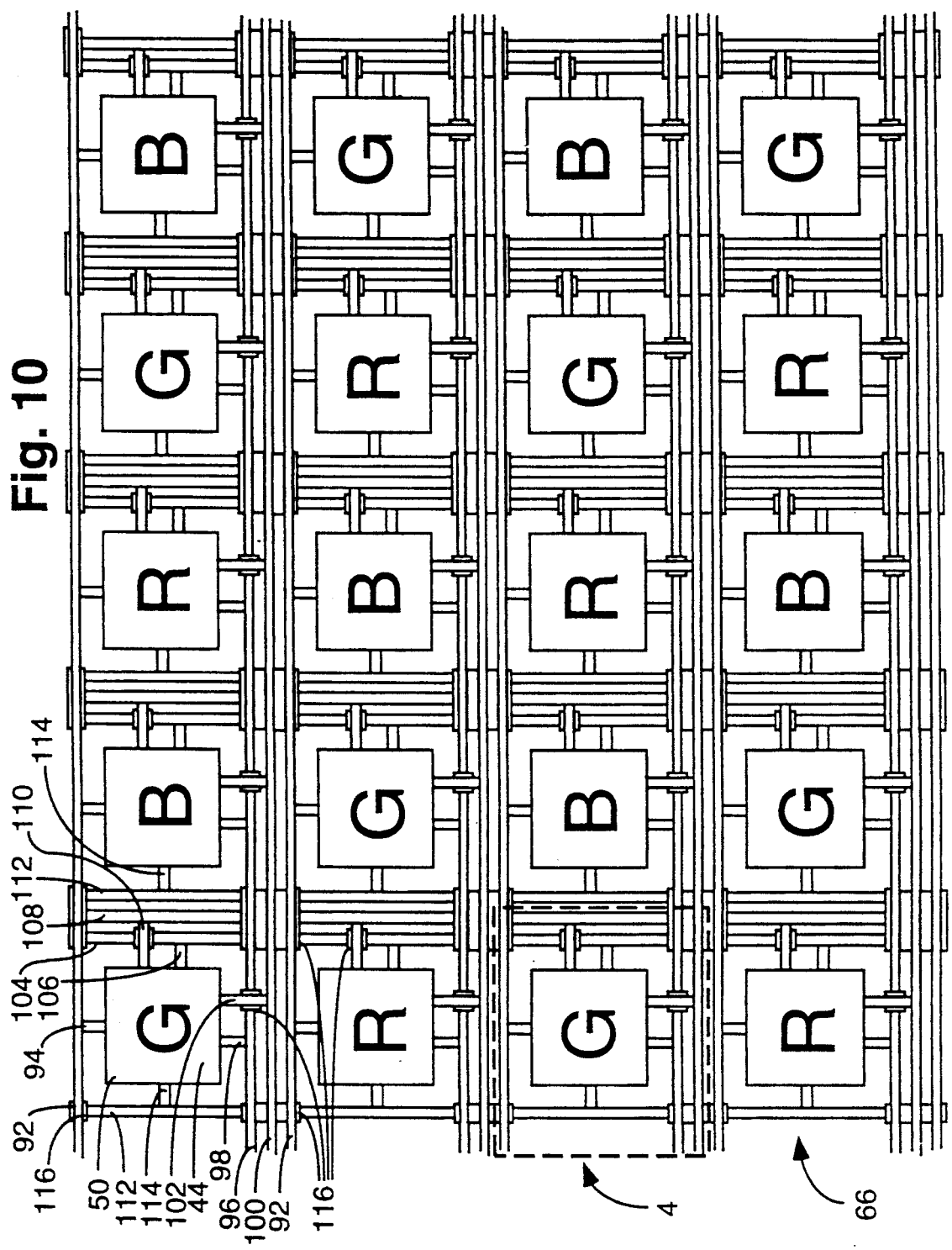
FIG. 10 shows one suitable pattern of colors suitable for dot-sequential image transducer scanning according to the invention.

It is apparent then, that an image sensor and display constructed as described above for the transducer 66 with suitable sequences of color pixels may be combined to form a true "dot-sequential" color system that uses a single-channel, tri-color image signal that has no more bandwidth than a monochrome system with the same number of pixels. FIG. 10 shows one suitable pattern of colors for this purpose, with the pixels 4 in odd lines having a green-blue-red sequence and the pixels 4 in even lines having a red-green-blue sequence.

Figure 11:
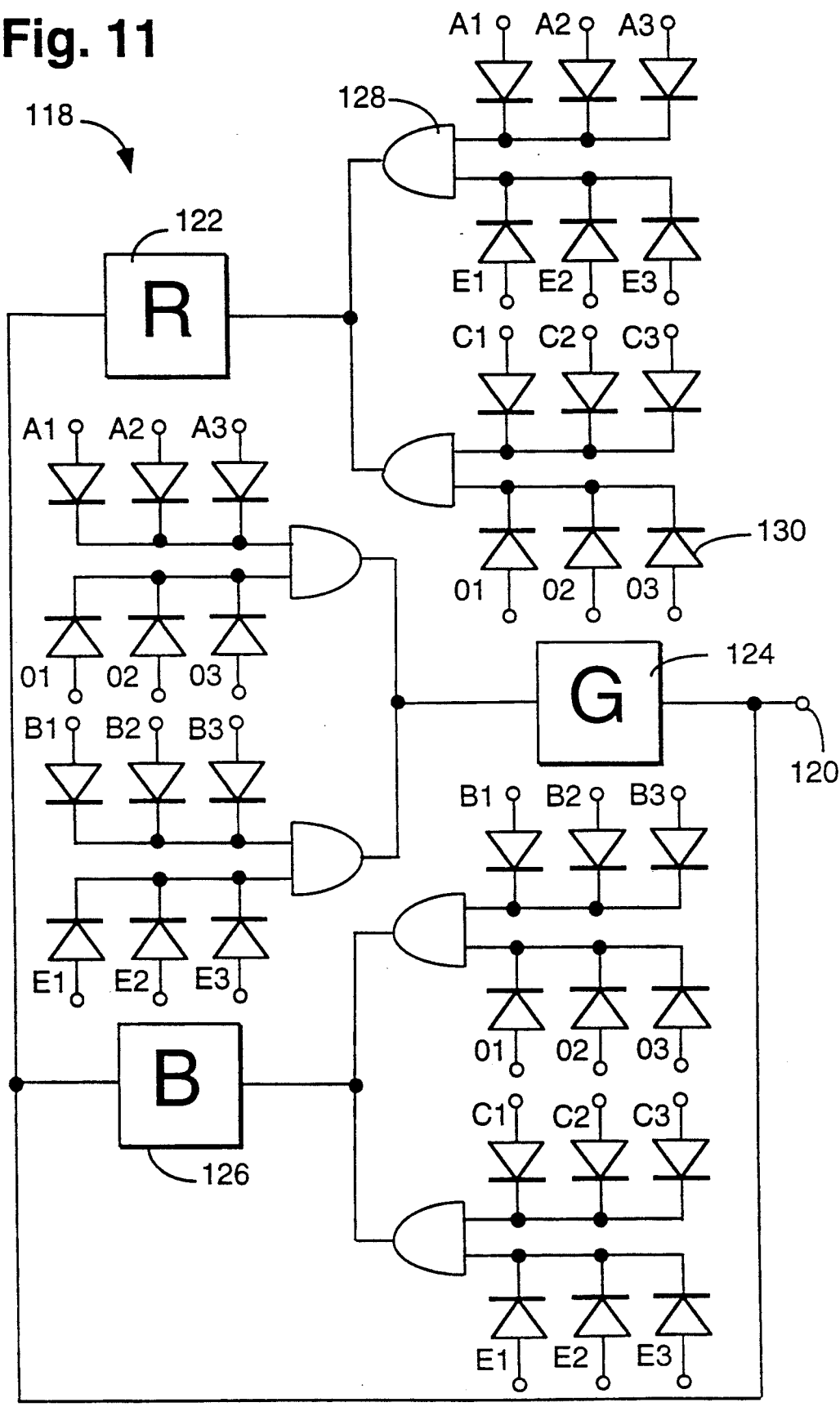
FIG. 11 shows a three channel to single channel color converter that is suitable for coupling a dot-sequential image sensor or display according to the invention with a conventional three channel simultaneous color system.

Although it is desirable to combine a single channel, dot-sequential tri-color image sensor according to the invention with a complementary single channel, dot-sequential tri-color image display according to the invention, many applications will require interfacing such a single channel, dot-sequential color image sensor or display with a conventional three channel, simultaneous color system. FIG. 11 shows a three channel to single channel color converter 118 that is suitable for coupling a dot-sequential image sensor or display according to the invention with a conventional three channel simultaneous color system.

The converter 118 can be adapted for converting a three channel simultaneous color system to single channel dot-sequential or vice versa. The converter 118 has a dot-sequential Input/output terminal 120 that is coupled to a switchable red channel 122, green channel 124 and blue channel 126. The switch inputs of the channels 122, 124 and 126 are coupled to the outputs of pairs of two-input AND gates 128. Each input of the two input AND gates 128 have three diodes 130. A first one of the AND gates 128 that has its output coupled to the red channel 122 also has one of its inputs coupled to the three outputs 70 of the gates 8 of the field group scanning signal line 68 for the even line field groups. The diodes 130 provide signal isolation between these groups.

The other one of the inputs for this one of the AND gates 128 is coupled to the outputs 90 of the first, fourth and seventh gates 8 of the color scanning signal line 88, using the diodes 130 for isolation. Thus, the red channel is switched on, coupling it to the dot-sequential input/output terminal 120 when the first, fourth or seventh of each sequential group of nine of the pixels 4 in each even line of the pixels 4 is selected. In a similar way, a second AND gate 128 switches the red channel 122 on when the third, sixth or ninth of each sequential group of nine of the pixels 4 in each odd line of the pixels 4 is selected.

A third one of the AND gates 128 switches the green channel 124 on when the first, fourth or seventh of each sequential group of nine of the pixels 4 in each odd line of the pixels 4 is selected. A fourth one of the AND gates 128 switches the green channel 124 on when the second, fifth or eighth pixel of each sequential group of nine of the pixels 4 in each even line of the pixels 4 is selected. A fifth one of the AND gates 128 switches the blue channel 126 on when the second, fifth or eighth of each sequential group of nine of the pixels 4 in each odd line of the pixels 4 is selected. A sixth one of the AND gates 128 switches the blue channel 126 on when the third, sixth or ninth of each sequential group of nine of the pixels 4 in each even line of the pixels 4 is selected.

Of course, the colors of the channels can be rearranged and switched in other orders. Other switching arrangements can be used for this purpose as well, this being only one suitable embodiment.

Thus there has been described herein methods and apparatus for propagating robust scanning signals for pixel addressing operations and isolation of an image signal from the pixel addressing operations in optoelectronic image transducers to reduce complexity and improve image fidelity. It will be understood that various changes in the details, materials, steps and arrangements of parts that have been described and illustrated above in order to explain the nature of the invention may be made by those of ordinary skill in the art within the principle and scope of the present invention as expressed in the appended claims.

What is claimed is:

1. For an optoelectronic image transducer that comprises a plurality of discrete picture elements arranged in rows and columns, and into spectral groups of picture elements, with each said group of elements having a different characteristic optical spectrum and said picture elements from each of said spectral groups arranged in a predetermined spectral order of spectral picture element sets, and said plurality of picture elements are individually addressed over a predetermined image frame scanning period that corresponds to the addressing of said plurality of picture elements that comprises a complete image frame, a method of sequentially addressing each of said picture elements, comprising the steps of:

sensitizing said picture elements to a scanning signal that comprises a singular pulse having a period of duration less than or substantially equal to the reciprocal of a picture element scanning rate to activate said picture elements upon receipt of said scanning signal propagated through a scanning signal path;

simultaneously coupling an image signal through an image signal path separate from said scanning signal path to all of said picture elements that has a signal level parameter that is proportional to a brightness level parameter of those of said picture elements that are activated; and propagating said pulse scanning signal through said scanning signal path in a predetermined spacial order of said rows and columns at said predetermined picture element scanning rate from one to another of said picture elements in each said spectral picture element set until all of said picture elements that comprise said complete image frame have been activated.

2. The method set forth in claim 1, wherein said plurality of spectral groups comprise three spectral groups of picture elements that have spectra that approximately correspond to the red, green and blue regions of the visible spectrum, respectively, and said step of propagating further comprises propagation of said singular pulse sequentially from one of said picture elements in one of said spectral groups to another of said picture elements in another of said spectral groups.

3. The method set forth in claim 2, wherein said step of propagating further comprises propagation of said singular pulse from each one of said picture elements in one of said spectral groups to another of said picture elements in another of said spectral groups in a predetermined repetitive pattern.

4. In an optoelectronic image transducer that comprises a plurality of discrete picture elements arranged in rows and columns, and into spectral groups of picture elements, with each said group of elements having a different characteristic optical spectrum and said picture elements from each of said spectral groups arranged in a predetermined spectral order of spectral picture element sets, and said plurality of picture elements are individually addressed over a predetermined image frame scanning period that corresponds to the addressing of said plurality of picture elements that comprises a complete image frame, apparatus for of sequentially addressing each of said picture elements, comprising:

means for sensitizing said picture elements to a scanning signal that comprises a singular pulse having a period of duration less than or substantially equal to the reciprocal of a picture element scanning rate to activate said picture elements upon receipt of said scanning signal propagated through a scanning signal path;

means for simultaneously coupling an image signal through an image signal path separate from said scanning signal path to all of said picture elements that has a signal level parameter that is proportional to a brightness level parameter of those of said picture elements that are activated; and means for propagating said pulse scanning signal through said scanning signal path in a predetermined spacial order of said rows and columns at said predetermined picture element scanning rate from one to another of said picture elements in each said spectral picture element set until all of said picture elements that comprise said complete image frame have been activated.

5. The apparatus set forth in claim 4, wherein said plurality of spectral groups comprise three spectral groups of picture elements that have spectra that approximately correspond to the red, green and blue regions of the visible spectrum, respectively, and said means for propagating propagates said singular pulse sequentially from one of said picture elements in one of said spectral groups to another of said picture elements in another of said spectral groups.

6. The apparatus set forth in claim 5, wherein said means for propagating propagates said singular pulse from each one of said picture elements in one of said spectral groups to another of said picture elements in another of said spectral groups in a predetermined repetitive pattern.

* * * * *